UNITED STATES PATENT OFFICE.

LEWIS KNAPP, OF NEW YORK, N. Y.

IMPROVEMENT IN GALVANIC PAINT FOR PROTECTING IRON FROM RUST, &c.

Specification forming part of Letters Patent No. 1,664, dated July 1, 1840.

*To all whom it may concern:*

Be it known that I, LEWIS KNAPP, of the city, county, and State of New York, engineer, have by experimental research discovered and invented and made and applied to use a certain new and useful Process in the Manufacture of Materials for Galvanizing Iron or Protecting Iron from Decay by Rust or Decomposition, the products of which process are also applicable to other useful purposes, for which improved process I seek Letters Patent of the United States; and I do hereby declare that the following is a substantial and correct specification of the said process as regards the means and materials employed and the results obtained thereby.

A kettle of any convenient size is to be so placed over a furnace that the metal may be readily dipped out, when melted, by a ladle and poured into a second kettle hung so as to tilt easily, and having a small hole in the bottom and a tray or mold beneath. A quantity of lead with twice the weight of zinc is to be melted in the first kettle with the kettle nearly at a red heat. In the bottom of the second kettle about three or four pounds of sulphate of iron, commonly called "green vitriol" or "copperas," and about four ounces of sal-ammonia are to be placed, so as to cover the hole, and over this about one hundred pounds of the melted mass of lead and zinc are to be poured quickly at a high heat to cover the copperas and ammonia. The more solid parts of the lead and zinc will now run off in a commixture or alloy through the hole in the bottom of the kettle into the mold or tray below, while the lighter and less pure portions become converted into a dark slate-colored powder, which works to the top of the mass, leaving below it in the kettle a dark slate-colored mass, which is at first of a paste-like consistence. This is to be thrown out of the kettle into a metal trough with the powder, and the whole worked together and mixed while yet hot by a hoe or other tool in a similar way to that in which mortar is worked, and during this operation to every one hundred pounds of the mixture about thirty pounds of finely-powdered copperas is to be added with about one pound of finely-powdered sal-ammonia. This last process resolves the mass into a powder of zinc and lead compounded with that portion of the copperas and ammonia which has not gone off in vapor. The results of these operations are, first, that the powder produced is at once ready to grind and mix with any oil commonly used for painting, and when mixed and laid on iron in the manner of common paint has all the effects of any other galvanic paint in protecting the iron from decay by rust or oxidation, as the affinity of the copperas and the ammonia for the iron causes the paint to adhere very closely, and yet these materials are prevented from injuring the iron by the galvanic effect of the oxide of zinc, and the portion of oxide of lead combined in the process serves to give the whole material a "body," as it is termed by painters, in the same manner as when the oxide of lead is used in any other paint; and, where economy and increased hardness are desirable, the addition to each one hundred pounds of the above powder of from fifty to sixty pounds of clean fresh-slaked lime sifted fine, and the whole mixture ground very fine together, will, when mixed with paint-oil in the usual manner, produce a galvanic paint, will set unusually hard and adhesive. The second result of this process is that the purified and amalgamated metal, which goes through the hole in the bottom of the second kettle, after passing the copperas, becomes an alloy of zinc and lead very similar in appearance to pewter, the qualities of which are that it melts at a moderate heat, and when melted in a sufficient quantity to dip sheets of iron previously cleaned by any proper process and dried the iron will come out with a clear, hard, bright, and smooth surface without the use of any ammonia when dipping. The iron thus dipped will not need cooling in water and will not be rendered brittle, while it will be free from lumps, specks, or blisters, such as are usually found on the surface when zinc alone is used, as in that mode the zinc is in a rapid process of decomposition by the heat and atmosphere, and much of the dross caused thereby adheres in different forms and figures to the face of the metal even when ammonia is freely used in the process. The alloy has enough of the galvanic quality of the zinc to protect the iron from decay by rust, and the joints in metal thus coated can be soldered in the usual way without any acid being used to prepare the metal for the operation of the hot soldering-tool.

It is evident that two important and useful objects are attained by this process at one operation. The dross caused in any other process is of little or no use, while that produced in this is of immediate value, and is not noxious in use, and the amalgamated metal or alloy produced is obtained in a state that when remelted to apply in coating iron no dross is raised and no ammonia is needful in the process, yet a perfect adhesive and smooth face is obtained, which will resist both the marine acid of the air near the sea and the operation of carbonic-acid gas from chimneys. The alloy obtained as thus described will work as solder in any way without acids, and may be used for still-worms or any similar purposes, and appears to be a metallic alloy or amalgam distinct from any other yet known; and the process by which these two results are obtained is effected with great rapidity, without any costly apparatus, and at a very reasonable expense, and, what is at least of equal importance, without any noxious vapors to injure the health of the workmen during the operation.

Should it be wished to increase the smoothness, brightness, and hardness of the above alloy in use, the mixture in the melting-kettle may be made in about the following proportions: To four parts of lead and six parts of zinc add one part of tin, weight for weight, and proceed in all respects as before described, which will produce an alloy more effective for use when sheets of iron are to be soldered together or when the alloy is used as solder only, or in other purposes for which this alloy is available.

What I claim as new and of my own discovery and invention is—

1. Forming of a galvanic paint for coating utensils of iron by pouring a mixture of lead and zinc, or lead, zinc, and tin, on a quantity of copperas and sal-ammonia placed in the bottom of a vessel, so as to form an oxide of said metals, and afterward combining with the oxide so formed a further quantity of copperas and sal-ammonia, all as herein set forth.

2. The combination of a portion of lime with the galvanic powder so produced, when such combination is used for the purpose of economizing the galvanic powder and making the paint so mixed harder and more adhesive, substantially in the manner hereinbefore set forth.

3. The mode herein set forth of forming an alloy of zinc and lead, or of zinc, lead, and tin, by pouring a mixture of said metals in a melted state on a quantity of copperas and sal-ammonia, which unites with the grosser parts and allows the purer parts to escape through the bottom of the vessel, as herein set forth.

In witness whereof I have hereunto set my hand in the city of New York, and in the presence of the witnesses subscribing hereto, this 18th day of February, 1840.

LEWIS KNAPP. [L. S.]

Witnesses:
JOHN W. CHAMBERS,
H. R. SEWELL.